United States Patent [19]

Takeichi et al.

[11] Patent Number: 5,700,874
[45] Date of Patent: Dec. 23, 1997

[54] ALKOXYSILANE-MODIFIED POLYMER AND ADHESIVE COMPOSITION USING SAID POLYMER

[75] Inventors: Hideo Takeichi; Yoichi Ozawa; Sei Aoki, all of Kodaira; Takashi Shimizu, Hachioji, all of Japan

[73] Assignee: Bridgestone Corporation, Tokyo, Japan

[21] Appl. No.: 518,324

[22] Filed: Aug. 23, 1995

[30] Foreign Application Priority Data

Aug. 25, 1994 [JP] Japan .................. 6-201060

[51] Int. Cl.$^6$ .................. C08F 275/00
[52] U.S. Cl. .................. 525/288; 525/250
[58] Field of Search .................. 525/288, 250

[56] References Cited

U.S. PATENT DOCUMENTS

| 4,143,089 | 3/1979 | Martin | 525/288 |
|---|---|---|---|
| 4,185,042 | 1/1980 | Verkouw | 525/332 |
| 4,783,504 | 11/1988 | St. Clair et al. | 525/72 |
| 4,822,857 | 4/1989 | Gorman et al. | 525/245 |
| 4,906,691 | 3/1990 | Joseph et al. | 525/99 |

FOREIGN PATENT DOCUMENTS

| 0067468 | 12/1982 | European Pat. Off. . |
|---|---|---|
| 52-5071 | 2/1977 | Japan . |
| 54-94597 | 7/1979 | Japan . |
| 56-104906 | 8/1981 | Japan . |
| 62-50346 | 3/1987 | Japan . |
| 64-22940 | 1/1989 | Japan . |

*Primary Examiner*—Melvyn I. Marquis
*Attorney, Agent, or Firm*—Sughrue, Mion, Zinn, Macpeak & Seas, PLLC

[57] ABSTRACT

A polymer modified with an alkoxysilane is prepared by a reaction forming a bond between an alkoxysilane compound represented by General Formula (I) and at least one of end parts of a conjugated diene/vinylaromatic hydrocarbon copolymer obtained by copolymerization of a conjugated diene and a vinylaromatic hydrocarbon using a lithium compound as an initiator. An adhesive composition contains 3% by weight or more of the polymer modified with an alkoxysilane. The polymer is used for an adhesive composition, can be prepared by a simple process, has excellent adhesive property and durability so that an additive such as a tackifier is not always required, and has essentially enhanced adhesive property to inorganic materials, in particular. The adhesive composition in which the polymer is used has excellent adhesive property and durability.

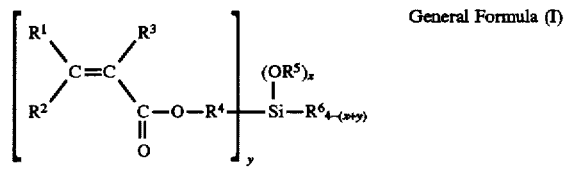

General Formula (I)

15 Claims, No Drawings

ALKOXYSILANE-MODIFIED POLYMER AND ADHESIVE COMPOSITION USING SAID POLYMER

FIELD OF THE INVENTION

The present invention relates to a polymer modified with an alkoxysilane compound and an adhesive composition using said polymer. More particularly, the present invention relates to a polymer having excellent adhesive property and an adhesive composition using said polymer.

PRIOR ART OF THE INVENTION

Among various types of polymers, copolymers such as styrene-butadiene random copolymers (hereinafter referred to as SBR), styrene-butadiene block copolymers (hereinafter referred to as SB), styrene-butadiene-styrene block copolymers (hereinafter referred to as SBS), and styrene-isoprene-styrene block copolymers (hereinafter referred to as SIS), have various applications because of the excellent workability, strength, abrasion resistance, and water resistance thereof. Such applications in recent years include adhesive compositions, pressure-sensitive adhesive compositions, modifiers for asphalt, and the like. Particularly, SBS and SIS are widely applied to adhesive compositions such as hot melt adhesive compositions due to the high strength, high cohesive strength, and thermoplastic property of these copolymers which makes them suitable for processing. The copolymers are generally used in combination with additives, such as tackifiers, oils, solvents, asphalt, resins, and fillers, in accordance with the application. However, the copolymers which are used as base materials do not by themselves exhibit satisfactory adhesion and pressure-sensitive adhesion to various types of substrates such as inorganic and organic materials. Therefore, development of a copolymer itself having improved adhesion and pressure-sensitive adhesion to various types of inorganic materials, such as glass, glass fibers, stones, metals, metal oxides, inorganic fillers and the like, and development of an adhesive composition and a pressure-sensitive adhesive composition using the copolymer have been desired.

Polymers modified for the purpose of enhancing affinity with silica, which is mixed as a filler in rubber compositions, have been known. For example, rubber compositions comprising silica and a polymer modified with a silane compound at molecular ends thereof have been disclosed, for example, in Japanese Patent Publication No. Showa 52(1977)-5071, Japanese Patent Application Laid-Open No. Showa 56(1981)-104906, Japanese Patent Application Laid-Open No. Showa 62(1987)-50346. Rubber compositions comprising silica and a polymer modified with a compound containing nitrogen at molecular ends of the polymer have been disclosed, for example, in Japanese Patent Application Laid-Open No. Showa 64(1989)-22940. The polymers described above are mainly diene polymers, and it is difficult to obtain adhesive properties required for adhesive compositions even though the affinity with silica is enhanced. As a process for preparation of a polymer modified with a silane compound at molecular ends thereof, a process comprising reaction of a silicon compound having a specific structure and molecular ends of the polymer has been disclosed in Japanese Patent Application Laid-Open No. Showa 54(1979)-94597. However, merely general applications of the resultant polymer as an elastomer or a thermoplastic elastomer are described as examples. Thus, development of a polymer material having excellent properties optimized for an adhesive composition or a pressure-sensitive adhesive composition has been desired.

SUMMARY OF THE INVENTION

Accordingly, an object of the present invention is to provide a polymer which is used for an adhesive composition, can be prepared by a simple process, is excellent in adhesive property and durability so that an additive such as a tackifier is not always required, and has essentially enhanced adhesive property to inorganic materials in particular.

Another object of the present invention is to provide an adhesive composition which uses the polymer and excels in adhesive property and durability.

The polymer modified with an alkoxysilane of the present invention is prepared by a reaction forming a bond between an alkoxysilane compound represented by General Formula (I) and at least one of end parts of a conjugated diene/vinylaromatic hydrocarbon copolymer obtained by copolymerization of a conjugated diene and a vinylaromatic hydrocarbon using a lithium compound as an initiator.

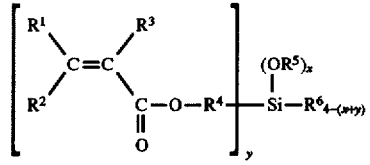

General Formula (I)

(wherein $R^1$, $R^2$, and $R^3$ each represent a hydrogen atom or a group selected from aliphatic, alicyclic, and aromatic hydrocarbon groups having 1 to 20 carbon atoms, and may be the same or different; $R^4$ and $R^6$ each represent a group selected from aliphatic, alicyclic, and aromatic hydrocarbon groups having 1 to 20 carbon atoms, and may be the same or different; $R^5$ represents a group selected from aliphatic, alicyclic, and aromatic hydrocarbon groups having 1 to 20 carbon atoms, and $OR^5$ may be the same or different when a plurality of $OR^5$ are comprised; x represents an integer of 1 to 3; y represents an integer of 1 to 3; and x+y represents an integer of 2 to 4.)

The adhesive composition of the present invention contains 3% by weight or more of a polymer modified with an alkoxysilane which is prepared by a reaction forming a bond between an alkoxysilane compound represented by General Formula (I) described above and at least one of end parts of a conjugated diene/vinylaromatic hydrocarbon copolymer obtained by copolymerization of a conjugated diene and a vinylaromatic hydrocarbon using a lithium compound as an initiator.

DETAILED DESCRIPTION OF THE INVENTION

Extensive investigations undertaken by the present inventors and focusing on components constituting a polymer and physical properties of the polymer lead to the discovery that the objects described above can be achieved by a polymer obtained by bringing at least one of end parts of a conjugated diene/vinylaromatic hydrocarbon copolymer into reaction with a compound represented by General Formula (I), such as a silicon compound having a methacryloxy group and an alkoxysilyl group, and can be achieved by an adhesive composition containing the polymer. The present invention has been achieved on the basis of the discovery.

The mechanism according to which the effect of the present invention is exhibited is not yet fully understood. It is considered that the effect is related to the polarization effect originated from the methacryloxy group and is also related to the large affinity between the alkoxysilane functional group at the end of the polymer and a substrate for adhesion.

The present invention is described in detail hereinafter.

The polymer modified with an alkoxysilane of the present invention is, for example, a conjugated diene/vinylaromatic hydrocarbon block copolymer having a methacryloxy group or a functional group containing a methacryloxy group bonded to at least one of end parts of the copolymer, wherein a silicon atom having at least one alkoxy group is bonded to the methacryloxy group or the functional group containing a methacryloxy group. Preferable examples of the polymer described above include polymers obtained by reaction of silane compounds with lithium atoms at end parts of a triblock copolymer (a so-called SBS living polymer) which is obtained from a vinylaromatic hydrocarbon and a conjugated diene using an organomonolithium initiator (RLi). In the reaction of a silane compound with a living polymer end, an alkoxysilane compound represented by General Formula (I) used as the silane compound has three sites reactive with the living polymer, which are the C=C double bond, the C=O group and the Si(OR$^5$)$_x$ group. There is the possibility that polymerization of the C=C group takes place to form a polymer of a low degree of polymerization (oligomerization) because of the conjugation of the C=C group and the adjacent C=O group. Therefore, the reaction product of a living polymer and an alkoxysilane compound is one or a mixture of two or more polymers which are respectively a polymer modified with the alkoxysilane compound. For example, when γ-methacryloxypropyltrimethoxysilane (hereinafter occasionally referred to as γ-MS) is used as the alkoxysilane compound, the reaction product, which is one or a mixture of two or more polymers which are each a polymer modified with the γ-MS as shown in the following formulae, is formed after a finishing treatment of the product, such as steam desolventization and treatment with a drum dryer. These formulae represent examples of the reaction product. [When the living polymer reacts with one type of the functional group in γ-MS alone:]

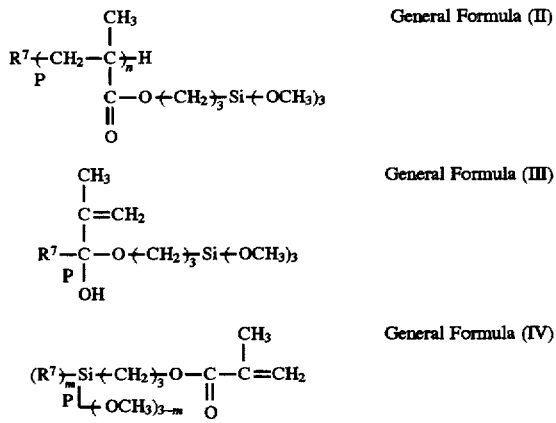

General Formula (II)

General Formula (III)

General Formula (IV)

[When the living polymer reacts with two or more molecules of γ-MS:]

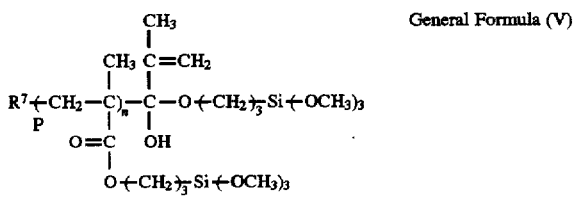

General Formula (V)

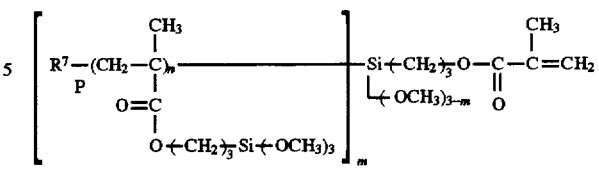

General Formula (VI)

In General Formulae (II), (III), (IV), (V), and (VI), R$^7$ represents an organic group R in the organomonolithium compound (RLi), P represents a conjugated diene/vinylaromatic hydrocarbon copolymer, n represents an integer of 1 or more, and m represents an integer of 1 to 3.

Further, the reaction product of a living polymer and an alkoxysilane compound is a linear and/or radial type coupled polymer, resulting from the reaction of polymer living ends with three reaction sites of an alkoxysilane.

Polymers comprising in the molecule thereof a plurality of structures modified with an alkoxysilane compound represented by General Formula (I) at end parts thereof [such as mixtures of the structures represented by General Formulae (II) to (VI)] can also be used preferably. For example, when an organic multi-functional lithium initiator, such as a compound represented by R(Li)$_2$ or R(Li)$_3$, is used in place of RLi described above, a polymer having a plurality of the chains described above can be obtained. In other words, a polymer having a plurality of chain end parts modified with an alkoxysilane compound can be obtained.

The polymer of the present invention is described in more detail hereinafter. In the above formulae, P represents a conjugated diene/vinylaromatic hydrocarbon copolymer. It is preferable that the structure of the conjugated diene/vinylaromatic hydrocarbon copolymer is selected from the group consisting of (A—B)$_n$, (A—B)$_n$A, (B—A)$_n$ and (B—A)$_n$B, wherein A represents a vinylaromatic hydrocarbon polymer block, B represents a conjugated diene polymer block, and n represents an integer of 1 to 4. It is more preferable that the structure of the conjugated diene/vinylaromatic hydrocarbon copolymer is selected from the group consisting of A—B, B—A and B—A—B. The conjugated diene monomer which is one of the monomers used for forming the copolymer is a conjugated diene hydrocarbon having 4 to 12 carbon atoms, preferably 4 to 8 carbon atoms, in one molecule. Examples of the conjugated diene monomer include 1,3-butadiene, isoprene, 2,3-dimethyl-1,3-butadiene, 1,3-pentadiene, octadiene, and the like. The conjugated diene monomer may be used singly or as a mixture of two or more types. Among these compounds, 1,3-butadiene and isoprene are preferable because of advantages in industrial application, such as availability in a larger quantity at a lower cost.

Examples of the vinylaromatic hydrocarbon monomer, which is the other monomer used for forming the copolymer, include styrene which is obtained by dehydrogenation of ethylbenzene and derivatives of styrene. Specific examples of the vinylaromatic hydrocarbon monomer include styrene, α-methylstyrene, p-methylstyrene, o-methylstyrene, p-butylstyrene, vinylnaphthalene, and the like. Among these compounds, styrene is preferable because of advantages in industrial application.

Micro-structures in the part of the conjugated diene polymer, such as cis-1,4, trans-1,4, and vinyl structures in polybutadiene are not particularly limited, and may be in a range which is generally obtained when an organolithium initiator is used. The ratio of contents of the 1,4-linkage (including the cis-1,4-structure and the trans-1,4 structure)

and the vinyl linkage is preferably in the range of 95/5 to 5/95, more preferably in the range of 90/10 to 30/70, because of better physical properties, such as strength, of the copolymer obtained.

The composition of the conjugated diene/vinylaromatic hydrocarbon copolymer, such as a butadiene/styrene copolymer, is not particularly limited. The ratio of contents of the conjugated diene and the vinylaromatic hydrocarbon is generally in the range of 20/80 to 95/5 by weight, and preferably 50/50 to 75/25 for achieving better overall balance of physical properties. The molecular weight of the obtained polymer is preferably in the range of 10,000 to 1,500,000, and more preferably in the range of 50,000 to 200,000 for application as the main material of an adhesive composition.

The structure of the polymer modified with an alkoxysilane compound of the present invention at the end part formed at the beginning of the polymerization is described in detail hereinafter. In the example described above, $R^7$ at the end part formed at the beginning of the polymerization represents an organic group in an organomonolithium compound (a residue group of the lithium), which is an alkyl group having 1 to 10 carbon atoms. The structure of the end part of the polymer formed at the beginning of the polymerization has, before the modification, the residue group of the lithium when an organolithium compound is used as the initiator. Therefore, the structure can be a structure having a residue group of the lithium, such as an organic group, an amine group, an imine group, an alkyltin group, or the like. The organolithium compound used as the initiator is described later.

$R^1$ and $R^2$ in General Formula (I), which represents the alkoxysilane compound, each represent a hydrogen atom or a group selected from aliphatic, alicyclic, and aromatic hydrocarbon groups having 1 to 20 carbon atoms, such as an alkyl group having 1 to 20 carbon atoms. $R^1$ and $R^2$ each preferably represent a hydrogen atom. $R^3$ represents a hydrogen atom or a group selected from aliphatic, alicyclic, and aromatic hydrocarbon groups having 1 to 20 carbon atoms, and preferably a group selected from aliphatic and alicyclic hydrocarbon groups having 1 to 6 carbon atoms.

Examples of the aliphatic hydrocarbon group represented by $R^3$ include methyl group, ethyl group, propyl group, butyl group, pentyl group, hexyl group, octyl group, and the like. Among these groups, methyl group is preferable. The alkoxysilane compound is a silane compound containing a methacryloxy group when $R^3$ represents methyl group. A hydrogen atom is also preferable. The alkoxysilane compound is a silane compound containing an acryloxy group when $R^3$ represents a hydrogen atom.

$R^4$ in General Formula (I), which represents the alkoxysilane compound, represents a group selected from aliphatic, alicyclic, and aromatic hydrocarbon groups having 1 to 20 carbon atoms, preferably an aliphatic hydrocarbon group having 1 to 20 carbon atoms, and more preferably an aliphatic hydrocarbon having 1 to 10 carbon atoms. Examples of $R^4$ include methyl group, ethyl group, propyl group, butyl group, pentyl group, hexyl group, octyl group, and the like. Among these groups, methyl group, ethyl group, propyl group, and butyl group are preferable.

$R^5$ in General Formula (I) represents a group selected from aliphatic, alicyclic, and aromatic hydrocarbon groups having 1 to 20 carbon atoms. The aliphatic hydrocarbon group and the alicyclic hydrocarbon group are as defined for $R^3$ in the above description. Among these groups, an alkyl group having 1 to 3 carbon atoms is preferable. Examples of the aromatic hydrocarbon group include phenyl group, naphthyl group, biphenyl group, anthryl group, phenanthryl group and the like.

$R^6$ in General Formula (I) represents a group selected from aliphatic, alicyclic, and aromatic hydrocarbon groups having 1 to 20 carbon atoms. Among these groups, an alkyl group having 1 to 3 carbon atoms is preferable.

In General Formula (I), x represents an integer of 1 to 3, y represents an integer of 1 to 3, and x+y represents an integer of 2 to 4. A combination of x=2 and y=2 and a combination of x=3 and y=1 are preferable. The combination of x=3 and y=1 is particularly preferable.

The molecular structure of the polymer is described hereinafter by using a polymer obtained by a specific process of polymerization as an example.

The process of polymerization in the present invention is not particularly limited. A specific process of polymerization used as an example is described hereinafter.

When an organolithium compound, such as RLi, is added to a reaction system in which at least monomers are present, copolymerization of the monomers initiated by the organolithium compound occurs. When a silane compound having a methacryloxy group or an acryloxy group is added to the polymer having an active lithium at the end part of the polymer after the polymerization is finished, the polymer of the present invention is obtained. A more specific example of the preparation of the polymer is shown in the following Preparation Example A. In this example, one of the monomers, which is styrene (S), is polymerized at first to obtain a polystyrene block (PS). Then, a block copolymer (SB) is obtained by polymerizing the other monomer, which is butadiene (B). Subsequently, a silane compound having a methacryloxy group, which is γ-methacryloxypropyltrimethoxysilane (γ-MS), is brought into reaction with the copolymer, to obtain a polymer of the present invention. The polymer obtained is any one of A-1, A-2, A-3, and A-4, or a mixture of two or more compounds selected from A-1, A-2, A-3, and A4.

Preparation Example A

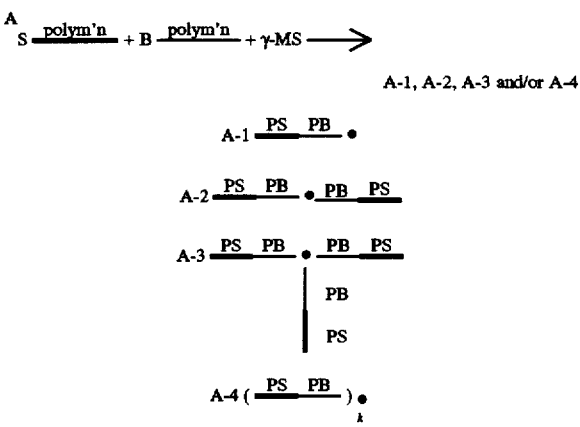

In the formula described above, PS represents a polystyrene block part, PB represents a polybutadiene block part, • represents one γ-MS group or a group formed by oligomerization of a plurality of γ-MS, and k represents an integer of 4 or more.

The polymers modified with an alkoxysilane represented by General Formulae (II) to (VI), which have been shown as preferable embodiments of the polymer modified with an alkoxysilane of the present invention, can be obtained, for example, by preparing a copolymer of a vinylaromatic hydrocarbon and a conjugated diene using RLi as the initiator, and subsequently allowing reaction between an active lithium at an end part of the prepared copolymer and a silane compound.

Specific examples of the silane compound include γ-methacryloxymethyltrimethoxysilane, γ-methacryloxyethyltrimethoxy-silane, γ-methacryloxypropyltrimethoxysilane, γ-methacryloxybutyltrimethoxysilane, γ-methacryloxypropyltriethoxysilane, γ-methacryloxypropyltripropoxysilane, γ-methacryloxypropyltributoxysilane, γ-methacryloxypropyltriphenoxysilane, γ-methacryloxypropylmethyldimethoxysilane, γ-methacryloxypropylethyldimethoxysilane, γ-methacryloxypropylethyldiethoxysilane, γ-methacryloxypropylmethyldiethoxysilane, γ-methacryloxypropylmethyldipropoxysilane, γ-methacryloxypropylmethyldibutoxysilane, γ-methacryloxypropylmethyldiphenoxysilane, γ-methacryloxypropyldimethylmethoxysilane, γ-methacryloxypropyldiethylethoxysilane, γ-methacryloxypropyldimethylethoxysilane, γ-methacryloxypropyldimethylphenoxysilane, γ-methacryloxypropyldiethylmethoxysilane, γ-methacryloxypropylmethyldiisopropenoxysilane, bis(γ-methacryloxypropyl)dimethoxysilane, bis(γ-methacryloxypropyl)diethoxysilane, bis(γ-methacryloxypropyl)dipropoxysilane, bis(γ-methacryloxypropyl)dibutoxysilane, bis(γ-methacryloxypropyl)diphenoxysilane, bis(γ-methacryloxypropyl)methylmethoxysilane, bis(γ-methacryloxypropyl)methylethoxysilane, bis(γ-methacryloxypropyl)methylpropoxysilane, bis(γ-methacryloxypropyl)methylbutoxysilane, bis(γ-methacryloxypropyl)methylphenoxysilane, tris(γ-methacryloxypropyl)methoxysilane, γ-methacryloxyethoxypropyltrimethoxysilane, γ-methacryloxyundecatrimethoxysilane, γ-acryloxymethyltrimethoxysilane, γ-acryloxyethyltrimethoxysilane, γ-acryloxypropyltrimethoxysilane, γ-acryloxybutyltrimethoxysilane, γ-acryloxypropyltriethoxysilane, γ-acryloxypropyltripropoxysilane, γ-acryloxypropyltributoxysilane, γ-acryloxypropyltriphenoxysilane, γ-acryloxypropylmethyldimethoxysilane, γ-acryloxypropylethyldimethoxysilane, γ-acryloxypropylethyldiethoxysilane, γ-acryloxypropylmethyldiethoxysilane, γ-acryloxypropylmethyldipropoxysilane, γ-acryloxypropylmethyldibutoxysilane, γ-acryloxypropylmethyldiphenoxysilane, γ-acryloxypropyldimethylmethoxysilane, γ-acryloxypropyldiethylethoxysilane, γ-acryloxypropyldimethylethoxysilane, γ-acryloxypropyldimethyphenoxysilane, γ-acryloxypropyldiethylmethoxysilane, γ-acryloxypropylmethyldiisopropenoxysilane, bis(γ-acryloxypropyl)dimethoxysilane, bis(γ-acryloxypropyl)diethoxysilane, bis(γ-acryloxypropyl)dipropoxysilane, bis(γ-acryloxypropyl)dibutoxysilane, bis(γ-acryloxypropyl)diphenoxysilane, bis(γ-acryloxypropyl)methylmethoxysilane, bis(γ-acryloxypropyl) methylethoxysilane, bis(γ-acryloxypropyl) methylpropoxysilane, bis(γ-acryloxypropyl) methylbutoxysilane, bis(γ-acryloxypropyl) methylphenoxysilane, tris(γ-acryloxypropyl)methoxysilane and the like. Among these compounds, γ-methacryloxypropyltrimethoxysilane, γ-acryloxypropyltrimethoxysilane, γ-methacryloxypropyltriethoxysilane, γ-acryloxypropyltriethoxysilane, γ-methacryloxypropylmethyldimethoxysilane, γ-acryloxypropylmethyldimethoxysilane, γ-methacryloxypropylmethyldiethoxysilane, γ-acryloxypropylmethyldiethoxysilane, γ-methacryloxyethoxypropyltrimethoxysilane, and γ-methacryloxyundecatrimethoxysilane are preferable. Further, among these compounds, γ-methacryloxypropyltrimethoxysilane and γ-acryloxypropyltrimethoxysilane are more preferable.

In the process for preparation of the polymer, a solvent is generally used. Examples of the solvent include aromatic hydrocarbon solvents, such as benzene, toluene, xylene and the like; aliphatic hydrocarbon solvents, such as n-pentane, n-hexane, n-butane and the like; alicyclic hydrocarbon solvents, such as methylcyclopentane, cyclohexane and the like; and mixtures of these solvents.

Examples of the lithium compound used as the polymerization initiator in the process for preparation of the polymer include alkyllithiums, alkylenedilithiums, phenyllithiums, stilbenedilithium and similar organic lithium compounds, such as n-butyllithium, sec-butyllithium, ethyllithium, propyllithium, t-butyllithium, hexyllithinm, 1,4-dilithiobutane, reaction products of butyllithium and divinylbenzene and the like; organometallic lithium compounds, such as tributyltinlithium and the like; and lithium amides, such as lithium diethylamide, lithium pyrrolide and the like [refer to Japanese Patent Application Laid-Open No. Showa 50(1975)-79590 and Japanese Patent Application Laid-Open No. Showa 52(1977)-22484]. In general industrial applications, n-butyllithium and sec-butyllithium can be advantageously used as the lithium compound.

Besides the monolithium compounds for the industrial applications described above, multi-lithium compounds, such as the dilithium compounds described above and trilithium compounds, can also be used as the lithium compound.

The lithium compound of the polymerization initiator may be used singly or as a mixture of two or more types. The amount of the lithium compound used is in the range of 0.2 to 30 mmol per 100 g of the monomers.

The conjugated diene monomer and the vinylaromatic monomer used for the polymerization are the same as those described above. When the copolymer used in the present invention is a block copolymer, each block in the block copolymer may be a homopolymer block consisting, for example, of butadiene alone or styrene alone, or may be a copolymer block containing styrene and butadiene in a specified ratio. Examples of the copolymer used in the present invention are as follows. As one example of the copolymer, a copolymer contains a first block which is a random block copolymer containing 80% styrene and 20% butadiene and a second block which is a random block copolymer containing 40% styrene and 60% butadiene, and is modified with a methacryloxysilane after the copolymer is prepared. As another example of the copolymer, a copolymer contains copolymer blocks having a tapered structure (a copolymer having a tapered distribution of butadiene and styrene). For example, the copolymer may have a three block structure consisting of blocks A, B, and C (B—C—A), in which block B is a homopolymer block of polybutadiene, block A is a homopolymer block of polystyrene, and block C is a copolymer block having such a structure that a part close to block B contains more butadiene than styrene, a part close to block A contains more styrene than butadiene, and intermediate parts contain continuously changing amounts of the two monomers. A copolymer having the structure described above and modified, for example, with γ-methacryloxysilane at the end of block B or A is also included in the polymer of the present invention. As described above, the polymer of the present invention may contain various combinations of blocks. The number of blocks is not particularly limited so long as it is two or more. However, a copolymer having a number of blocks in the range of 2 to 4 is preferable because of easier preparation.

A micro-structure modifier is preferably used in the polymerization for accelerating the polymerization of the monomers and/or for preparing a polymer having a specified molecular structure made of a conjugated diene and a vinylaromatic hydrocarbon. The micro-structure modifier is a compound having the function of controlling the micro-structure of a conjugated diene polymer, such as the function of increasing the content of the 1,2-linkage in the butadiene part and the content of the 3,4-linkage in the isoprene part, and the function of controlling the distribution of a conjugated diene and a vinylaromatic hydrocarbon, such as randomization or block formation of styrene and butadiene. The micro-structure modifier used in the present invention is not particularly limited, and any type of conventionally used modifier can be used. Examples of the micro-structure used in the present invention include the following compounds:

(1) ethers,
(2) complexes of alkali metals with ketones or triesters of phosphorous acid,
(3) compounds represented by the following formulae:

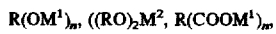

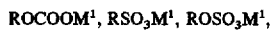

wherein R represents a group selected from aliphatic, alicyclic, and aromatic hydrocarbon groups, $M^1$ represents an alkali metal, particularly lithium, sodium, potassium, rubidium, or cesium, $M^2$ represents an alkaline earth metal, specifically calcium or barium, and n represents an integer of 1 to 3, and
(3) tertiary amines.

The micro-structure modifier is described more specifically hereinafter. The micro-structure modifier may be used singly or as a combination of two or more types.

(1) Examples of the ether include 1,2-dimethoxyethane, 1,2-diethoxyethane, tetrahydrofuran, 2-methoxymethyltetrahydrofuran, diethyl ether, triethylene glycol dimethyl ether, veratrol, isohomoveratrol and the like.

(2) Examples of the complex of an alkali metal with a ketone or a triester of phosphorous acid include complexes of ketones, such as acetone, methyl ethyl ketone, diisopropyl ketone, benzophenone, acetophenone, dibenzyl ketone, fluorenone, xanthone, Michler's ketones, acetylacetone and the like, or triesters of phosphorous acid, such as triethyl phosphite, trioctyl phosphite, tribenzyl phosphite, trinonyl phosphite and the like, with lithium, sodium, potassium, rubidium, or cesium.

(3) The micro-structure modifiers represented by the formulae shown above are described hereinafter.

Examples of the alkali metal salt or alkaline earth metal salt of an alcohol or a phenol represented by $R(OM^1)_n$ or $(RO)_2M^2$ include lithium, sodium, potassium, rubidium, cesium, calcium, and barium salts of methyl alcohol, ethyl alcohol, isopropyl alcohol, tert-butyl alcohol, tert-amyl alcohol, cyclohexyl alcohol, allyl alcohol, 2-butenyl alcohol, benzyl alcohol, phenol, catechol, resorcinol, hydroquinone, 1-napthyl alcohol, p-nonylphenol, pyrogallol and the like.

Examples of the alkali metal salt of a carboxylic acid or the alkali metal ester salt of hydrogencarbonic acid represented by $R(COOM^1)_n$ or $ROCOOM^1$ include lithium, sodium, potassium, rubidium, and cesium salts of isovaleric acid, lauric acid, palmitic acid, stearic acid, oleic acid, rhodinic acid, benzoic acid, pimellic acid, n-dodecyl hydrogencarbonate, phenyl hydrogencarbonate and the like.

Examples of the alkali metal salt of a sulfonic acid or the alkali metal ester salt of sulfuric acid represented by $RSO_3M^1$ or $ROSO_3M^1$ include lithium, sodium, potassium, rubidium, and cesium salts of dodecylbenzenesulfonic acid, diisopropylnaphthalenesulfonic acid, laurylamide of N-methyl-N-methanesulfonic acid salts, sulfuric acid ester salts of lauryl alcohol, sulfuric acid ester of caproylethylene glycol and the like.

(4) Examples of the tertiary amine include triethylamine, tetramethylethylenediamine and the like.

Among these micro-structure modifiers, (1) ethers and (3) compounds represented by the formula $R(OM^1)_n$ are preferable.

The micro-structure modifier is used in an amount in the range of 0.01 to 1000 mol equivalent per 1 mol equivalent of the organolithium compound.

The temperature of polymerization is generally in the range of −20° to 150° C., preferably in the range of 0° to 100° C.

The concentration of monomers in a solution is generally in the range of 5 to 50% by weight, preferably in the range of 10 to 35% by weight.

The polymerization reaction is conducted by bringing monomers into contact with an initiator in a liquid phase. The polymerization is preferably conducted at a pressure which is sufficient for keeping the polymerization system substantially to a liquid phase. It is also preferred that any substance adversely affecting the polymerization is excluded from all the materials used in the polymerization system. The reaction between a silane compound having a methacryloxy group or an acryloxy group and the copolymer formed by the polymerization is preferably conducted in an atmosphere which does not cause deactivation of the active lithium at end parts of the copolymer, such as a nitrogen atmosphere. It is preferred that occurrence of coupling reactions is suppressed to a minimal degree so that as many alkoxysilane groups as possible remain because the alkoxysilane group at the end parts of the copolymer is considered to contribute to the enhanced adhesive property of the copolymer produced.

As described above, in the alkoxysilane compound represented by General Formula (I) used in the present invention, such as a methacryloxyalkoxysilane and an acryloxyalkoxysilane, a plurality of the molecules of the alkoxysilane compound may be added to an end part of the living polymer and polymerized by addition with the C=C bond. Therefore, the number of the alkoxysilane group or other polar groups added to one molecule of the living polymer can be increased by using more than one equivalent of a methacryloxyalkoxysilane or an acryloxyalkoxysilane per one molecule of the living polymer.

Accordingly, the amount of the silane compound used as the alkoxysilane modifier is in the range of 0.01 to 100 mol equivalent, preferably in the range of 0.3 to 10 mol equivalent, per 1 mol of the active lithium at the end part of the living polymer.

After the reaction is finished, the prepared polymer can be obtained by blowing steam into the polymer solution obtained by the reaction to remove the solvent, or by coagulating the polymer with addition of a poor solvent, such as methanol, followed by drying with heated rolls or under a vacuum. The polymer can also be obtained by directly removing the solvent with heated rolls or under a vacuum.

The polymer of the present invention can be used for various applications in a solid form as well as in the form of a polymer solution or a polymer latex.

The adhesive composition of the present invention is described hereinafter. In the adhesive composition of the present invention, the polymer of the present invention described above is used in an amount of 3% by weight or more based on the entire amount of the adhesive composition. The content is not particularly limited as long as it is 3% by weight or more. Therefore, the content may be 100% by weight. In other words, the polymer of the present invention may be used as the adhesive composition without any other component. It is more preferable that the adhesive composition contains 5 to 70% by weight of the polymer of the present invention for exhibiting better adhesive property. As other components which may be contained in the adhesive composition, any ingredients used in conventional adhesive compositions may be used as long .as the ingredients do not adversely affect the effects of the present invention. Examples of other components which may be used together include rubber such as natural rubber, polymers other than the polymer of the present invention, silica, zinc oxide, stearic acid, lubricants, oils, solvents, antioxidants, antiozonants, tackifiers, resins and the like.

A rubber other than the polymer of the present invention, which may be used in the adhesive composition of the present invention is comprised in an amount of 70 parts by weight or less based on 100 parts by weight of the polymer of the present invention.

In recent applications of adhesive compositions, so called solution type or latex type adhesive compositions and pressure-sensitive adhesive compositions are used, as well as adhesive compositions and pressure-sensitive adhesive compositions prepared by adding the ingredients described above to a solid polymer. The solution type or latex type adhesive compositions and pressure-sensitive adhesive compositions are prepared by adding necessary amounts of additives to a polymer solution such as a polymer solution obtained after polymerization, or to a polymer latex prepared after the solution polymerization. The polymer modified with alkoxysilane of the present invention may also be used for a solution type or latex type adhesive composition or a solution type or latex type pressure-sensitive adhesive composition used in such applications.

To summarize the advantages obtained by the invention, the polymer of the present invention can be used for an adhesive composition, can be prepared by a simple process, has excellent adhesive property and durability so that an additive such as a tackifier is not always required, and has an essentially enhanced adhesive property to inorganic materials in particular. The adhesive composition of the present invention uses the polymer of the present invention and has excellent adhesive property and durability.

EXAMPLES

The invention will be understood more readily with reference to the following examples. However, these examples are intended to illustrate the invention and are not to be construed as limiting the scope of the invention.

Measurements in the examples were conducted according to the following methods.

The number-average molecular weight ($M_n$) and weight-average molecular weight ($M_w$) of a copolymer were measured by gel permeation chromatography (GPC; apparatus: HLC-8020, produced by Toso Co., Ltd.; column: GMH-XL, a product of Toso Co., Ltd., two columns connected in series) using the differential refractive index (RI), and the result was calibrated with a monodisperse polystyrene as the reference.

The micro-structure of the butadiene part of a polymer was obtained by the infrared spectroscopy (Morero's method). The content of bound styrene in a butadiene-styrene copolymer was obtained from a ratio of integrals in a $^1$H-NMR spectrum.

The peeling strength of a polymer was measured according to the method of Japanese Industrial Standard K6854.

Example 1

Into a 500 ml reactor which had been dried and purged with nitrogen, 48 g of cyclohexane, 12 g of styrene monomer, and 60 ml of a 1 molar solution of tetrahydrofuran (THF) were placed. After adding 0.7 ml of a 1.7 molar solution of n-butyllithium (BuLi), the mixture was allowed to react at 50° C. for 1 hour. Then, 36 g of 1,3-butadiene monomer and 204 g of cyclohexane were added to the reaction mixture, and the resultant mixture was allowed to react at 50° C. for 3 hours. After the reaction, 48 g of cyclohexane and 12 g of styrene monomer were added to the reaction mixture, and the resultant mixture was allowed to react at 50° C. for 1 hour.

To the solution of a polymer thus obtained, 1.2 ml of a 1 molar solution of γ-methacryloxypropyltrimethoxysilane (γ-MS) was added as the silane compound having a methacryloxy group, and the polymer was modified at 50° C. for 30 minutes. Isopropyl alcohol was added to the resultant solution, and the formed solid product was dried to obtain rubbery polymer G-1. Rubbery polymer G-1 was analyzed by GPC, and it was found that the polymer had a molecular weight distribution showing two peaks corresponding to the base polymer obtained previously and a high molecular weight part formed presumably by coupling of two or more molecules of the base polymer. The overall weight-average molecular weight was 18.45×104. Other data on this polymer are shown in Table 1. By taking all these data into consideration, it could be confirmed that the polymer obtained above was a mixture of the polymers represented by General Formulae (II) to (VI).

The peeling strength of this polymer was evaluated by using glass and stainless steel (SUS) as substrates. The results are shown in Table 1.

Example 2

According to the same procedures as those in Example 1 except that 2.4 ml of a 1 molar solution of THF was used, rubbery polymer G-2 was obtained. Rubbery polymer G-2 had the same molecular structure as that of G-1 except that the content of bound styrene in the copolymer and the content of the vinyl structure in the butadiene part were different. Data on this polymer, such as molecular weights, are shown in Table 1. The peeling strength of this polymer was evaluated in a similar manner to the evaluation of the peeling strength of the polymer in Example 1. The results are shown in Table 1.

Comparative Example 1

According to the same procedures as those in Example 1 except that the silane compound having a methacryloxy group (γ-MS) was not used, rubbery polymer G-3 was obtained. The obtained polymer was found to be a conventional SBS.

Properties of the polymer and the peeling strength of an adhesive composition prepared from the polymer were measured. The results are shown in Table 1.

Comparative Example 2

According to the same procedures as those in Example 1 except that methyltriethoxysilane (MTEOS) having no methacryloxy group was used in place of the silane compound having a methacryloxy group (γ-MS), rubbery polymer G-4 was obtained. As is easily understood from Preparation Example A described above, it was found that, in the obtained polymer, methylethoxysilane group alone was bonded to a SBS copolymer and no methacryloxy group or functional group containing a methacryloxy group was bonded to the SBS copolymer.

The results of evaluation of properties and peeling strength of the polymer are shown in Table 1.

TABLE 1

| | Example 1 | Example 2 | Comparative Example 1 | Comparative Example 2 |
|---|---|---|---|---|
| rubbery polymer | G-1 | G-2 | G-3 | G-4 |
| block copolymer | SBS | SBS | SBS | SBS |
| modifier | γ-MS | γ-MS | iPrOH (used for termination) | MTEOS |
| peak-top $M_n$ (× $10^4$) | 9.2 | 9.3 | 9.2 | 9.15 |
| $M_w/M_n$ | 1.05 | 1.04 | 1.04 | 1.07 |
| overall $M_w$ (× $10^4$) | 18.5 | 17.2 | 9.6 | 13.1 |
| $M_w/M_n$ | 1.64 | 1.28 | 1.07 | 1.31 |
| coupling ratio (%) | 68.0 | 69.0 | 0 | 30.0 |
| content of vinyl structure (%) | 48.0 | 8.4 | 49.0 | 48.0 |
| content of styrene (%) | 40.8 | 39.9 | 40.3 | 40.4 |
| block styrene (%) | 88.0 | 91.0 | 85.0 | 82.2 |
| peeling strength | | | | |
| glass | 3.3 | 3.5 | 0.40 | 0.55 |
| SUS | 2.9 | 3.3 | 0.80 | 1.10 |

As is clearly shown in Table 1, it was confirmed that the polymer of the present invention is superior in adhesion to inorganic materials, such as glass and metals, as compared with the polymers in the Comparative Examples.

What is claimed is:

1. A polymer modified with an alkoxysilane which is prepared by a reaction forming a bond between an alkoxysilane compound represented by General Formula (I) and at least one of end parts of a conjugated diene/vinylaromatic hydrocarbon copolymer obtained by copolymerization of a conjugated diene and a vinylaromatic hydrocarbon using a lithium compound as an initiator;

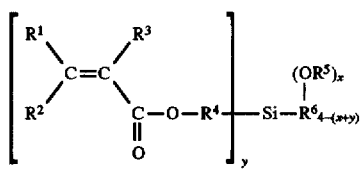

General Formula (I)

wherein $R^1$, $R^2$, and $R^3$ each represent a hydrogen atom or a group selected from the group consisting of an aliphatic, an alicyclic, and an aromatic hydrocarbon group having 1 to 20 carbon atoms, and may be the same or different; $R^4$ and $R^6$ each represent a group selected from the group consisting of an aliphatic, an alicyclic, and an aromatic hydrocarbon group having 1 to 20 carbon atoms, and may be the same or different; $R^5$ represents a group selected from the group consisting of an aliphatic, an alicyclic, and an aromatic hydrocarbon group having 1 to 20 carbon atoms, and $OR^5$ may be the same or different when a plurality of $OR^5$ are present; x represents an integer of 1 to 3; y represents an integer of 1 to 3; and x+y represents an integer of 2 to 4.

2. A polymer modified with an alkoxysilane according to claim 1, wherein the structure of the conjugated diene/vinylaromatic hydrocarbon copolymer is selected from the group consisting of $(A—B)_n$, $(A—B)_nA$, $(B—A)_n$ and $(B—A)_nB$, wherein A represents a vinylaromatic hydrocarbon polymer block, B represents a conjugated diene polymer block, and n represents an integer of 1 to 4.

3. A polymer modified with an alkoxysilane according to claim 1, wherein the structure of the conjugated diene/vinylaromatic hydrocarbon copolymer is selected from the group consisting of A—B, B—A and B—A—B, wherein A represents a vinylaromatic hydrocarbon polymer block and B represents a conjugated diene polymer block.

4. A polymer modified with an alkoxysilane according to claim 2, wherein A is polystyrene block and B is polybutadiene block or polyisoprene block.

5. A polymer modified with an alkoxysilane according to claim 1, wherein the alkoxysilane compound is γ-methacryloxypropyltrimethoxysilane, γ-acryloxypropyltrimethoxysilane, γ-methacryloxypropyltriethoxysilane, γ-acryloxypropyltriethoxysilane, γ-methacryloxypropylmethyldimethoxysilane, γ-acryloxypropylmethyldimethoxysilane, γ-methacryloxypropylmethyldiethoxysilane, γ-acryloxypropylmethyldiethoxysilane, or γ-methacryloxyundecatrimethoxysilane.

6. A polymer modified with an alkoxysilane according to claim 1, wherein the alkoxysilane compound is γ-methacryloxypropyltrimethoxysilane or γ-acryloxypropyltrimethoxysilane.

7. A polymer modified with an alkoxysilane according to claim 1, wherein the alkoxysilane compound is used in an amount of 0.3 to 10 mol equivalent per 1 mol of active lithium at the end parts of the copolymer.

8. An adhesive composition containing 3% by weight or more of a polymer modified with an alkoxysilane which is prepared by a reaction forming a bond between an alkoxysilane compound represented by General Formula (I) and at least one of end parts of a conjugated diene/vinylaromatic hydrocarbon copolymer obtained by copolymerization of a conjugated diene and a vinylaromatic hydrocarbon using a lithium compound as an initiator;

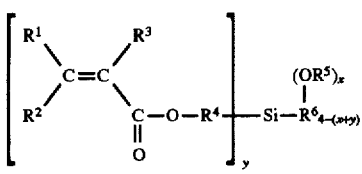

General Formula (I)

wherein $R^1$, $R^2$, and $R^3$ each represent a hydrogen atom or a group selected from the group consisting of an aliphatic, an alicyclic, and an aromatic hydrocarbon group having 1 to 20 carbon atoms, and may be the same or different; $R^4$ and $R^6$ each represent a group selected from the group consisting of an aliphatic, an alicyclic, and an aromatic hydrocarbon group having 1 to 20 carbon atoms, and may be the same or different; $R^5$ represents a group selected from the group consisting of an aliphatic, an alicyclic, and an aromatic hydrocarbon group having 1 to 20 carbon atoms, and $OR^5$ may be the same or different when a plurality of $OR^5$ are present; x represents an integer of 1 to 3; y represents an integer of 1 to 3; and x+y represents an integer of 2 to 4.

9. An adhesive composition according to claim 8, wherein the adhesive composition contains 5 to 70% by weight of the polymer modified with an alkoxysilane compound.

10. A polymer modified with an alkoxysilane according to claim 8, wherein the structure of the conjugated diene/vinylaromatic hydrocarbon copolymer is selected from the group consisting of $(A—B)_n$, $(A—B)_nA$, $(B—A)_n$ and $(B—A)_nB$, wherein A represents a vinylaromatic hydrocarbon polymer block, B represents a conjugated diene polymer block, and n represents an integer of 1 to 4.

11. A polymer modified with an alkoxysilane according to claim 8, wherein the structure of the conjugated diene/vinylaromatic hydrocarbon copolymer is selected from the group consisting of A—B, B—A and B—A—B, wherein A represents a vinylaromatic hydrocarbon polymer block and B represents a conjugated diene polymer block.

12. A polymer modified with an alkoxysilane according to claim 10, wherein A is polystyrene block and B is polybutadiene block or polyisoprene block.

13. An adhesive composition according to claim 8, wherein the alkoxysilane compound is γ-methacryloxypropyltrimethoxysilane, γ-acryloxypropyltrimethoxysilane, γ-methacryloxypropyltriethoxysilane, γ-acryloxypropyltriethoxysilane, γ-methacryloxypropylmethyldimethoxysilane, γ-acryloxypropylmethyldimethoxysilane, γ-methacryloxypropylmethyldiethoxysilane, γ-acryloxypropylmethyldiethoxysilane, or γ-methacryloxyundecatrimethoxysilane.

14. An adhesive composition according to claim 8, wherein the alkoxysilane compound is γ-methacryloxypropyltrimethoxysilane or γ-acryloxypropyltrimethoxysilane.

15. An adhesive composition according to claim 8, wherein the alkoxysilane compound is used in an amount of 0.3 to 10 mol equivalent per 1 mol of active lithium at the end parts of the copolymer.

* * * * *